United States Patent

Pogorsky et al.

[11] 3,924,052
[45] Dec. 2, 1975

[54] INDUCTION FURNACE

[76] Inventors: Viktor Konstantinovich Pogorsky, ulitsa Poligraficheskaya, 24 a, kv. 247; Vitaly Petrovich Polischuk, ulitsa Vernadskogo, 85, kv. 122, both of Kiev, U.S.S.R.

[22] Filed: June 7, 1974

[21] Appl. No.: 477,273

[52] U.S. Cl. ............................................. 13/29
[51] Int. Cl.² ........................................ H05B 5/14
[58] Field of Search ............................ 13/29, 26, 27

[56] References Cited
UNITED STATES PATENTS
| | | | |
|---|---|---|---|
| 2,648,716 | 8/1953 | Lindner et al. | 13/29 |
| 3,786,163 | 1/1974 | Kohama | 13/29 |
| 3,851,090 | 11/1974 | Folgerö et al. | 13/29 X |

*Primary Examiner*—R. N. Envall, Jr.
*Attorney, Agent, or Firm*—Haseltine, Lake & Waters

[57] ABSTRACT

An induction furnace with a crucible whose space is subdivided by vertical partitions into at least three chambers and a bottom is made as a chute open from above, with the chambers communicating with one another through said chute. In addition, the extreme or flanking chambers communicate through the U-shaped duct of a detachable conduit fitted with means for electric heating of the metal. Set up under each of the middle or intermediate chambers is an open magnetic circuit ensuring the tapping of molten metal from the chambers.

4 Claims, 8 Drawing Figures

INDUCTION FURNACE

The present invention relates to induction furnaces for use in founding and metallurgy for preheating molten metal and subsequent pouring into foundry moulds.

At present induction channel-type furnaces are employed for heating molten metal and subsequent pouring it into foundry moulds. The design of such furnace depends mainly from a metal tapping procedure.

For pouring hot metal into foundry moulds some of the furnaces are tilted in relation to their horizontal axes with the help of an electromechanical or a hydraulic drive. Peculiar to the drives is a sophisticated construction and control circuit, which are required to provide uniform and adjustable pouring of the metal into the moulds.

Heated metal is tapped from the furnace in portions. With mould pouring cycle of cycles of several seconds the metal constantly moves which increases its surface in contact with the surrounding atmosphere and results in a higher rate of oxidation and in the loss of dopants. The metal surface is covered with slag whose entrapment into the foundry moulds is undesirable. Therefore bottom-pour ladles are utilized to remove the slag.

Moreover, it is a characteristic of such furnaces that they have an irregular wear of the crucible lining. Certain induction channel-type furnaces have crucibles with bottoms fitted with openings closed with a stopper through which openings the metal is tapped into the foundry moulds. Such furnaces are more simple in design.

However, industrial experience has shown that the stopper wearing out in the course of operation, it does not close tightly the opening in the crucible bottom, which causes undesirable losses of molten metal. Moreover, to replace the stopper the furnace crucible must be completely emptied from metal which disturbs furnace temperature conditions and extends stillstands of both the furnace and the automatic casting lines. When pouring such metals as iron and steel, the stoppers wear out more rapidly. To reduce their wear the stoppers are produced from a refractory featuring high strength which enhances the cost of operation of the furnace.

Certain induction channel-type furnaces are furnished with an air-tight crucible within which an overpressure is built up ensuring the tapping of the molten metal into the foundry moulds. Typical of such furnaces is a sophisticated design. With large overall dimensions of the furnace and a high metal temperatures it is difficult to preserve furnace air-tightness, whereas its deterioration results in a lesser accuracy in proportioning the molten metal and in its losses.

The servicing of the air-tight furnaces is more complicated, and it is more difficult to control lining conditions therein and to carry out minor repairs. Moreover, the addition of molten metal into the crucible of the above furnaces is more difficult, as well as treating the metal with refining and doping agents, and slag removal from the surface of the metal. They also call for supplying inert gas into the air-tight crucible to produce a protective atmosphere therein which prevents oxidation and saturation of the metal with undesirable constituents.

Known in the art is an induction furnace comprising a crucible with a space for molten metal bounded by the crucible walls and its bottom. The crucible space communicates with a duct of a detachable conduit for molten metal encompassing the windings of closed magnetic circuits. In addition, use is made of an open magnetic circuit with windings on pole pieces encompassing a section of the detachable conduit. For pouring metal from the crucible, provision is made for a dismountable pipe which is set up in the crucible (cf. see, British Pat. No. 1221762).

Owing to the use of electromagnetic force for pouring the metal into the foundry mould the above furnaces require neither electromechanical nor hydraulic drives, stoppers and crucible-sealing appliances. All this allowed simplifying the furnace desing, enhancing its reliability in operation and alleviating labour conditions or attending personnel.

However, in the course of operation of the above furnace a problem was uncountered related to the use of a dismountable pipe for pouring high-melting point metals into foundry moulds. Industrial experiments have proved that the service life of refractory pouring pipes diminishes materially in such cases, and, hence, a large amount of spare pipes is needed. Moreover, the preparation and carrying out of operations associated with pipe replacement require additional time.

As shown by industrial experiments, the dismountable pouring pipe determines to a great extent furnace reliability in service when used for pouring high-melting point metals into the foundry moulds.

It is worth noting that in all the prior-art induction channel-type furnaces molten metal can be poured only into a single foundry mould. This is a common disadvantage of all the furnaces.

The principal object of the invention is the provision of an induction furnace with a higher output, providing also the simultaneous and controllable pouring of metal in a single or in several separate streams.

Another object of the invention is to simplify the construction and to provide more convenient servicing of such furnaces.

These and other objects of the invention are achieved by the provision of an induction furnace, comprising a crucible whose walls and bottom bound a space for molten metal in communication with a U-shaped duct of a detachable metal conduit encompassing the winding of a closed magnetic circuit, and an open magnetic circuit with windings on pole pieces. The furnace is fitted, according to the invention, with vertical partitions subdividing the crucible space into at least three chambers of which the two extreme or flanking ones communicate with one another through the U-shaped conduit duct while at least one intermediate chamber has in its upper wall portion a tray for tapping molten metal. The crucible bottom is made as a chute section, open from about and interconnecting the chambers with the pole pieces of the open magnetic circuit, encompassing the chute section disposed under the intermediate chamber or chambers.

The vertical partitions mounted in the crucible space form a separate intermediate chamber from which the metal can be poured into the foundry moulds.

The use of the middle chamber with the wall provided in its upper portion, together with the metal-pouring tray, makes it possible to simplify the furnace design (to obviate the use of a pouring pipe) and to facilitate its attendance. The arrangement of the middle chamber directly within the crucible enables an enhancement of the furnace reliability during service. The furnace bottom made as a chute enables the chambers to communicate with one another and to close an electric circuit of the detachable metal conduit duct through the molten metal. This contributes to uniform heating of the metal in each chamber. The chute-like bottom allows the gap to be reduced between the pole pieces of the open magnetic circuit, which reduces the electric power input for generating an electromagnetic force by means of which the metal is poured into the foundry mold from the middle chamber.

It is recommended that the induction furnace be fitted with several intermediate chamber and with a similar amount of the open magnetic circuits whose pole pieces encompass chute sections located accordingly beneath the chambers.

The use of vertical partitions, mounted within the space of the crucible of the induction furnace, results in the formation of several middle chambers from which hot metal is poured concurrently into several foundry molds. This considerably enhances the output of both the induction furnace and the automatic foundry lines operating in conjunction therewith.

It is also suggested that the crucible bottom be made removable, that is renewable and adapted to be fastened to the lower portion of the crucible.

This allows replacing the worn-out bottom by a new one, prepared beforehand, taking it off and fastening it during short stillstands, only slightly affecting furnace temperature conditions. The use of a renewable and readily replaceable bottom decreases the time required for bottom lining repairs, and enables a saving in refractory materials insofar as a failure of the bottom lining does not necessitate the replacement of the furnace crucible lining.

The upper section of the vertical partition separating the outer chamber can have an opening through which it can communicate with the neighbouring chamber.

In such a furnace the pouring of the heated metal into the foundry molds can be performed simultaneously with its mixing with reagents, which reduces the time for metal conditioning and the preparation for pouring. Stirring can be effected in two chambers. Thus the metal enclosed in one plant can be mixed with the reagents, different in terms of their chemical compositions, which enhances the efficiency of use, and reduces the amount of reagents required.

The present invention will be better understood from a consideration of a detailed description of an exemplary embodiment thereof, to be had in conjunction with the accompanying drawings, wherein.

Figure 1:
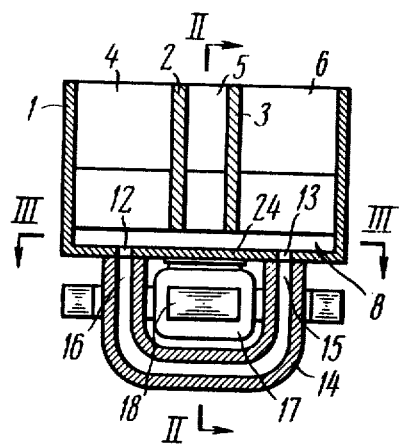
FIG. 1 shows an exemplary induction furnace with a single middle chamber, according to the invention, in a longitudinal section by a vertical plane.
Figure 2:
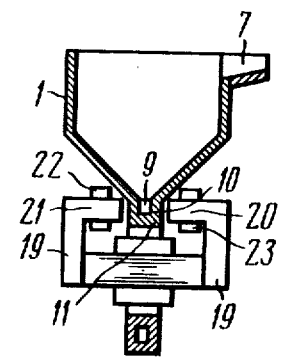
FIG. 2 is a section II — II of FIG. 1.

An induction furnace with a crucible 1 is shown in FIG. 1 whose space is subdivided by vertical partitions 2 and 3 into chambers 4, 5 and 6. Two chambers 4 and 6 are extreme as flanking in relation to the intermediate chamber 5. In the upper portion of the wall of the intermediate chamber 5 there is a tray 7 (FIG. 2) for discharging molten metal. A bottom 8 of the crucible 1 is made as a chute 9 open from above.

The space of the chute 9 (FIG. 1) is bounded by walls 10 (FIG. 2) and a bottom 11, the latter being provided in the zone of the flanking chambers 4 and 6 with two through openings 12, 13. Connected to the crucible bottom is a detachable conduit 14 with a U-shaped duct with outlets 15, 16 adjacent to the through openings 12, 13 in the bottom 11. The conduit 14 encompasses a winding 17 of a closed magnetic circuit 18.

Figure 3:
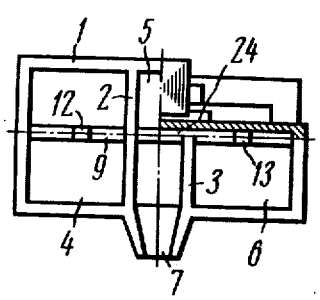
FIG. 3 is a section III — III of FIG. 1.

The chambers 4, 5 and 6 communicate with one another through the space of the chute 9, with the metal in the chute 9 closing in the course of operation an electric circuit through the metal in the conduit duct. An open magnetic circuit 19 has windings 22, 23 on pole pieces 20, 21. The latter encompass from both sides and overlap a section 24 (FIG. 3) of the chute 9 located under the intermediate chamber 5.

The furnace operates in the following manner. With the furnace crucible filled with molten metal a short-circuited loop of metal is formed around the winding 17 of the closed magnetic circuit 18. An electric current is induced in the loop, which current heating the metal.

The electric current passing through the winding and the molten metal in the duct gives rise to electrodynamic forces which cause metal circulation in the duct. The rate of this circulation can be increased by proper duct geometry. The circulation results in metal stirring, contributes to its heating and to the equalizing of its temperature within the crucible.

When the metal is poured into a foundry mould the windings 22 and 23 arranged on the pole pieces 20 and 21 of the open magnetic circuit 19 are energized. A magnetic field is established between the pole pieces of the magnetic circuit, the field permeating the molten metal through which the electric current flows in the section 24 of the chute located beneath the intermediate chamber 5. The interaction between the electric current and the magnetic flux in the molten metal results in an electromagnetic force which acts on the metal, causing its transfer.

The direction of electric current and magnetic field between the pole pieces 20 and 21 is chosen so that the electromagnetic force is directed upwards. In this case the molten metal is forced from the outer chambers 4 and 6 (FIG. 1) into the middle or intermediate one 5. The level of the molten metal in this chamber will rise, and when it reaches the tray 7 the metal flows from the chamber into the foundry mould.

The electromagnetic force and the metal raising rate in the intermediate chamber depend upon the magnitude of the electric current in the metal and the magnetic field between the pole pieces 20 and 21 (FIG. 2) of the open magnetic circuit 19. To adjust the electromagnetic force the power supplied to the winding is individually varied. To stop pouring, the current in the windings 22 and 23 of the open magnetic circuit 19 is switched off or reversed. The above-described exemplary induction furnace ensures controllabe pouring of metal into a single foundry mould.

Figure 4:
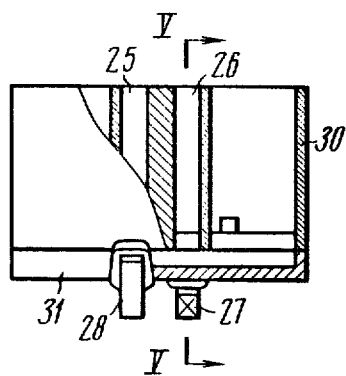
FIG. 4 is a front view with a fragmentary cutaway of another induction furnace with two intermediate chambers and a conduit connected to a crucible wall.

To increase the output of the furnace and to enable the simultaneous pouring of metal streams into several foundry moulds, the crucible can accommodate several middle or intermediate chambers, for example, two such chambers, 25, 26, and two independent open magnetic circuits 27, 28 can be used, such as in another inventive furnace embodiment (FIG. 4).

Figure 5:
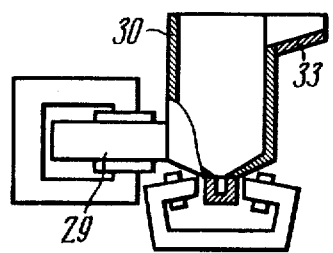
FIG. 5 is the same furnace with a fragmentary cutaway along the section V—V in FIG. 4.

With this arrangement a conduit 29 (FIG. 5) is attached to a crucible 30 whose bottom 31 (FIG. 4) is made removable or renewable with respect to the crucible 30; it is adapted to be attached to a lower part of the crucible. This facilitates the replacement of the bottom 31 by a new one prepared beforehand and allows its detaching and fastening to the crucible during a temporary stillstand, a feature which contributes to maintaining normal temperature conditions of the furnace lining in operation. The removable, that is renewable and readily replaceable furnace bottom enables savings in lining materials insofar as a failure of the bottom lining does not necessitate the replacement of the crucible 30 lining.

Figure 6:
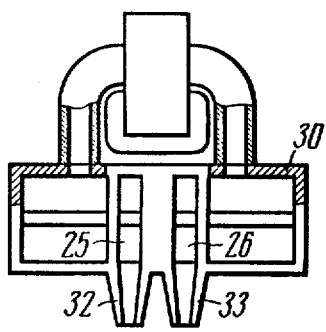
FIG. 6 is a top view of the same furnace with a fragmentary cutaway in the zone of connection of the conduit to the crucible.

Each of the intermediate chambers 25, 26 has a respective discharging tray 32, 33 (FIG. 6). They enable the pouring of metal into two foundry moulds simultaneously but with different characteristics which can be adjusted by varying the power supplied to the windings of the open magnetic circuits 27 and 28 (FIG. 4). The above-described induction furnace allows processing the metal being poured into the foundry moulds with reagents and with stirring.

Figure 7:
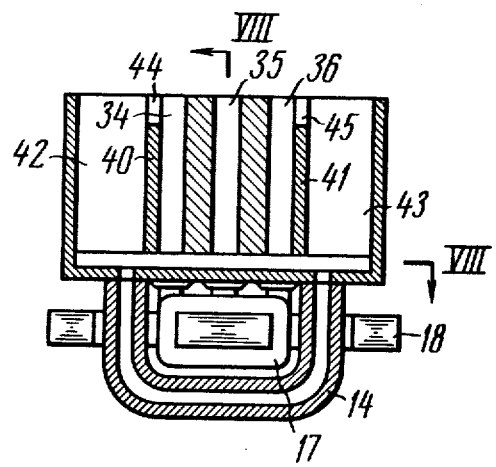
FIG. 7 is a longitudinal section by a vertical plane of a further induction furnace with three intermediate and two flanking chambers.
Figure 8:
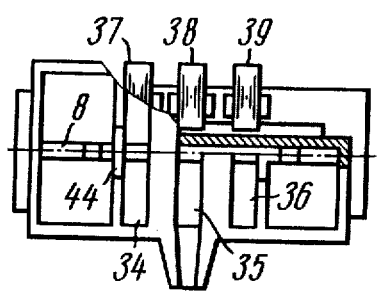
FIG. 8 is a top view of the same furnace with a fragmentary cutaway along a section VIII — VIII in FIG. 7.

FIG. 7 depicts a further exemplary induction furnace with three middle or intermediate chambers 34, 35 and 36 and three open magnetic circuits 37, 38 and 39 (FIG. 8). Vertical partitions 40 and 41 (FIG. 7) of the extreme or flanking chambers 42 and 43 may have openings 44 and 45 in their upper sections. Molten metal charged into the chambers 34 and 36 ascends to the level of the openings 44 and 45 in the partitions 40 and 41 and continuously flows into the flanking chambers 42 and 43. Similar openings can be provided in the partitions of the earlier described furnace embodiments.

By using three independent open magnetic circuits 37, 38, 39 (FIG. 8) the metal can be mixed and poured into the foundry moulds with various speeds by varying the power supplied to the windings of each of the open magnetic circuits.

The induction furnace according to the present invention features a number of advantages in comparison with the known induction furnaces. An induction furnace with vertical partitions forming several intermediate chambers ensures the simultaneous pouring of metal into several foundry moulds. This enhances considerably the output of both the furnace and the automatic casting lines and makes it possible to simplify the construction of the furnace, to facilitate its servicing, and to enhance its reliability in service.

The use of electromagnetic fields enables the controllable pouring of metal with different technological characteristics to be effected simultaneously into several foundry moulds.

A renewable crucible bottom diminishes materially the consumption of refractory materials. With the furnace in operation the metal is poured and concurrently mixed with reagents, which decreases metal conditioning time. The metal is stirred in two extreme or flanking chambers. This enables to mix the metal in one furnace with reagents different as to their chemical compositions, decreasing thereby their consumption.

The inventive induction furnace embodiments provide for free access to the metal, which allows adding new portions into the furnace and removing slag both when pouring the metal into the foundry mould and during intervals between pouring cycles.

Tests of the proposed induction furnace according to the invention have proved its high serviceability enhanced output and dependability in service, convenient servicing and efficiency when used for metal pouring.

What we claim is:

1. An induction furnace comprising a crucible whose walls and bottom define a space for molten metal; vertical partitions subdividing said space into at least three chambers, two of which flank at least one intermediate chamber; a tray for discharging the molten metal from said at least one intermediate chamber, fixed on an upper section of its wall; said bottom of the crucible being made as at least one chute section, open from above and intercommunicating said chambers; a detachable metal conduit with a substantially U-shaped duct communicating with the flanking chambers of said crucible space; a closed magnetic circuit having a winding encompassed by said conduit; and at least one open magnetic circuit having windings wound on respective pole pieces encompassing said at least one chute section, disposed under said at least one intermediate chamber.

2. The induction furnace as defined in claim 1, which comprises at least two of said intermediate chambers and a similar number of said at least one open magnetic circuit whose pole pieces encompass respective ones of said chute sections that are disposed under said at least two intermediate chambers.

3. The induction furnace as defined in claim 1, wherein said bottom of the crucible is removable and attachable to a lower section of said crucible.

4. The induction furnace as defined in claim 1, wherein an upper portion of said partitions has therein an opening through which at least one of said flanking chambers communicates with said at least one intermediate chamber.

* * * * *